Patented May 17, 1932

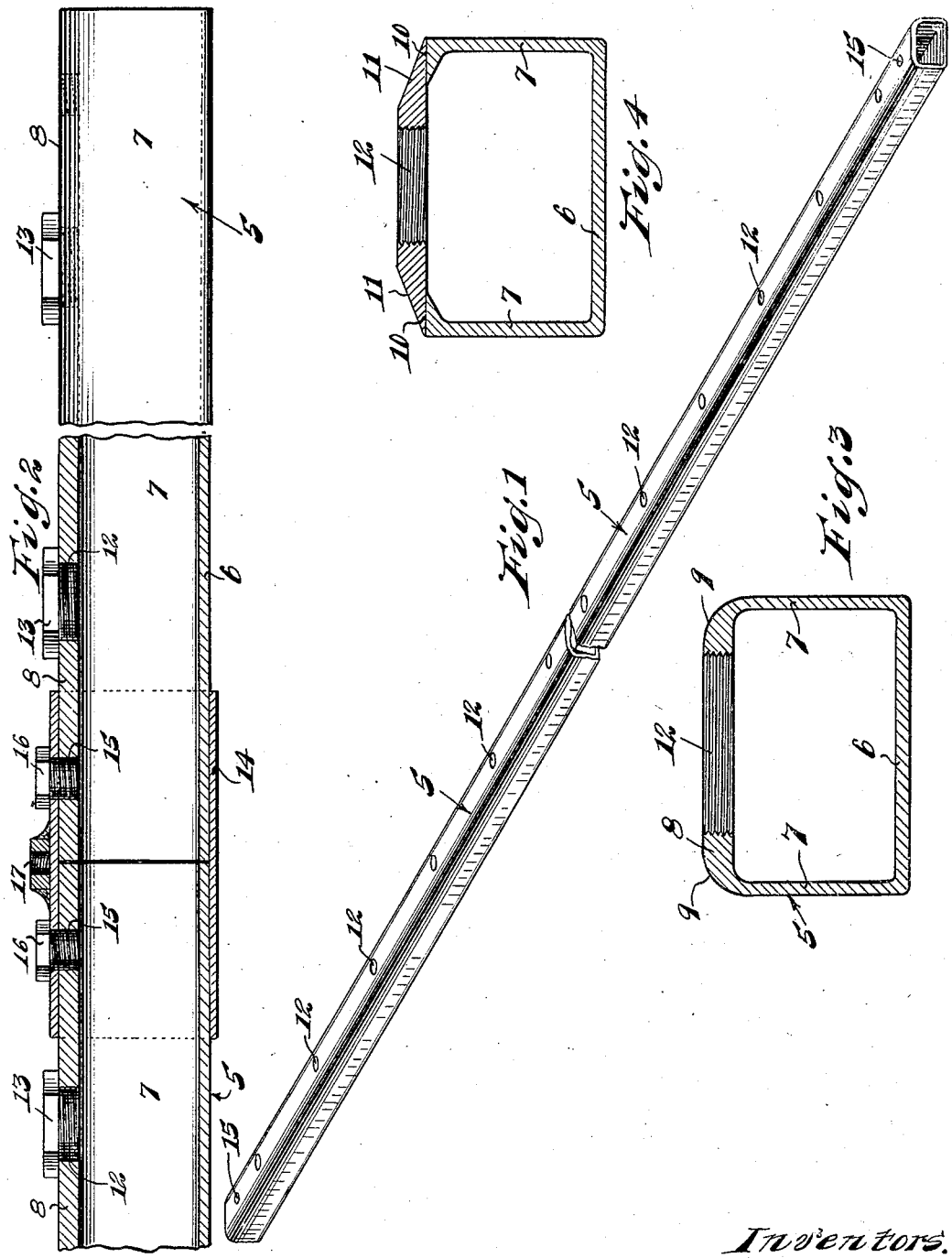

1,859,259

UNITED STATES PATENT OFFICE

GEORGE L. CHAMBERLAIN AND GUSS H. GNEISS, OF CHICAGO, ILLINOIS; SAID GNEISS ASSIGNOR TO SAID CHAMBERLAIN

ELECTRICAL WIRING CONDUIT

Application filed July 8, 1929. Serial No. 376,769.

This invention relates to conduits or ducts, for electrical wiring, and more particularly to those used in what are known as floor duct systems wherein the conduits or ducts are installed in the floors of building structures and usually are embedded beneath the surface of the floor. These ducts are usually made of metal and, in some cases, of compressed fibre or the like, and are originally laid as a permanent part of the system, but having provision for tapping into the ducts at many different places throughout the length thereof where outlets for the conductors are required. In the original installation fittings are attached to these ducts insofar as the desired locations are known at the time of installation. However, additional connections may be made after the floor is completed by cutting into the floor to expose the conduit at the point where the outlet fitting is to be applied and patching the floor after the connection has been completed.

As above stated, the conduits or ducts are usually made of metal or compressed fibre and, as a matter of economy, and also to minimize weight, the walls of the conduits are usually of relatively thin gage. Consequently, owing to the rough character of the work and methods of constructing concrete floors the conduits or ducts become damaged and deformed to a considerable extent and, furthermore, nails are accidentally driven into the top walls of the ducts in nailing the usual wooden finishing floor material in place.

The present invention has for its principal object to produce a novel conduit or duct tube, preferably of substantially rectangular cross section, and having an armored top wall which will permit of the bottom and side walls being of relatively thin gage, and yet the structure as a whole is rigid to a considerable degree to withstand the rough usage to which it may be subjected, and is not easily punctured, and a relatively thick body is afforded for the screw-threading of the outlet openings in which the usual fittings are attached. Another object of the invention, in addition to the armored and stiffening features above noted, is to avoid protuberances on the outer face of the top wall of the conduit or duct which ordinarily occur due to the necessity of flanging the portion of the top wall around the usual tap openings provided in the relatively thin walled conduits or ducts for the purpose of providing sufficient screw threads to attach the outlet fittings thereto. Other objects and advantages to be attained will hereinafter more fully appear.

In the accompanying drawings, illustrating practical adaptations of the invention, Fig. 1 is a perspective view of a preferred form of the conduit or duct;

Fig. 2 is a fragmentary view, on an enlarged scale, partly in side elevation and partly in longitudinal section, illustrating the manner of coupling two of the conduits or ducts together in endwise relation;

Fig. 3 is a cross section through the duct on an enlarged scale; and

Fig. 4 is a cross section of a modified duct structure.

Referring now to the drawings, the numeral 5 illustrates a duct of preferred cross section and shown more particularly in detial in Fig. 3. As shown, this duct is of substantially rectangular form in cross section, it having a relatively thin bottom wall 6 and side walls 7, and a relatively thick top wall 8. The two opposite upper corner portions of the duct are rounded off or tapered, as at 9, said corner portions being thus shaped primarily to deflect nails which might otherwise puncture the conduit in the region thereof, the relatively thick intermediate body of the top wall also offering considerable resistance to nails being driven there against.

In addition to serving as a puncture-proof armor, the relatively thickened top wall 8 prevents collapsing of the wall to a considerable degree and at the same time stiffens the structure so that the conduit is not easily bent in a lateral direction, yet under certain conditions which make it necessary the duct may be bent when due force is applied.

The tube may be drawn or otherwise formed or molded in a single piece without seams or, in some cases, the bottom and side walls may be formed in channel shape from a single sheet of metal of a certain gage and the top wall produced separately of a relatively heavier gage and the two sections then welded together at the meeting marginal portions, somewhat as indicated along the seam line 10 of the modification illustrated in Fig. 4 of the drawings. In this modification the cross sectional form of the duct is somewhat different from that illustrated in Fig. 3. Instead of rounding the upper corners of the duct, as at 9, they are chamfered or beveled, as at 11, the effect being substantially the same in that the beveled portion 11 will serve to deflect nails and, at the same time, an arched effect for the top wall is maintained in the structure.

In practice the ducts will be made in unitary lengths, and at regular intervals the top wall is provided with openings 12 which are internally screw-threaded for the attachment of the usual outlet fittings, and those openings which are not used for outlets are normally closed by removable plugs 13 which are secured therein instead of the said fittings. The meeting end portions of adjoining duct sections in the system as installed are attached together by a coupling sleeve 14 whose walls are preferably of the same gage throughout and whose interior contour is a counterpart of the exterior contour of the duct sections. The coupling sleeve 14 is provided with apertures to register with corresponding apertures 15 in the top walls of the duct sections near the ends thereof for the reception of securing bolts 16. This coupling member is also provided with a socket 17 at the middle thereof for the attachment of a marker for the purpose of finding the location of the several plugged outlet openings after the ducts have been embedded and concealed within the floor structure. However, the structure and function of the coupling element 14 is not concerned in the invention as claimed in the present application, but is subject-matter of a co-pending application for Letters Patent and claimed separately therein, said application being filed of even date with the present application and bearing Serial Number 376,771, and resulting in Letters Patent No. 1,825,049, issued September 29, 1931.

Obviously, the structure admits of considerable modification without departing from the spirit and scope of the invention as defined by the appended claims. The invention, therefore, is not limited to the specific construction and arrangement shown in the accompanying drawings.

Having thus described our invention, what we claim as new and desire to secure by Letters Patent is:

1. A duct member of the character described comprising an integrally formed tube having an armored top wall substantially as and for the purpose set forth.

2. In a duct of the character described, an integrally formed tube of substantially rectangular cross section, said tube having an armored top wall with sloping edge portions.

3. In a duct of the character described, an integrally formed tube of substantially rectangular cross section, said tube having relatively thin bottom and side walls, and a relatively thick top wall, the upper corner portions of said tube tapered to afford deflecting surfaces.

4. In a duct of the character described, an integrally formed metal tube of substantially rectangular cross section, the bottom and side walls of said tube being of relatively thin gage, and the top wall being of relatively thick gage, the upper corner portions of said tube being tapered to afford deflecting surfaces and the intermediate body portion of the top wall being provided at intervals throughout the length of the tube with outlet openings having provision for direct attachment of removable plug elements and outlet fitting extensions interchangeably therein.

5. In a duct of the character described, an integrally formed metal tube of substantially rectangular cross section, the bottom and side walls of said tube being of relatively thin gage, and the top wall being arched and the middle portion thereof relatively thick, the upper corner portions of said tube being tapered to afford deflecting surfaces and the intermediate body portion of the top wall being provided at intervals throughout the length of the tube with outlet openings, said outlet openings being internally screw-threaded for the direct attachment of correspondingly threaded removable plugs and outlet fitting extensions interchangeable therein.

In testimony whereof we have signed our names to this specification.

GEORGE L. CHAMBERLAIN.
GUSS H. GNEISS.